(12) United States Patent
Pedros

(10) Patent No.: US 8,157,993 B1
(45) Date of Patent: Apr. 17, 2012

(54) NITROUS OXIDE REDUCTION FROM BIOLOGICAL WASTEWATER TREATMENT PROCESSES

(76) Inventor: Philip B. Pedros, Wakefield, MA (US)

( * ) Notice: Subject to any disclaimer, the term of this patent is extended or adjusted under 35 U.S.C. 154(b) by 274 days.

(21) Appl. No.: 12/657,418

(22) Filed: Jan. 21, 2010

(51) Int. Cl.
*C02F 3/30* (2006.01)

(52) U.S. Cl. ........ 210/188; 210/202; 210/218; 210/258; 210/603; 210/604; 210/903

(58) Field of Classification Search ................. 210/188, 210/202, 218, 220, 258, 259, 603, 604, 605, 210/630, 903

See application file for complete search history.

(56) References Cited

U.S. PATENT DOCUMENTS

| | | | |
|---|---|---|---|
| 4,173,531 A * | 11/1979 | Matsch et al. ................ | 210/903 |
| 4,581,143 A | 4/1986 | Pepper, III | |
| 5,287,281 A | 2/1994 | Meaney | |
| 5,776,344 A | 7/1998 | McCarty et al. | |
| 5,820,760 A | 10/1998 | Spector | |
| 5,967,099 A | 10/1999 | Patrick | |
| 6,183,643 B1 * | 2/2001 | Goodley ....................... | 210/903 |
| 6,214,228 B1 * | 4/2001 | Jones et al. .................. | 210/603 |
| 6,444,124 B1 * | 9/2002 | Onyeche et al. .............. | 210/202 |
| 6,866,779 B1 * | 3/2005 | Burke .......................... | 210/603 |
| 7,384,554 B2 * | 6/2008 | Rittmann et al. ............. | 210/220 |
| 7,451,751 B2 | 11/2008 | Atherley | |
| 7,867,398 B2 * | 1/2011 | Harmon et al. ............... | 210/604 |
| 7,879,236 B2 * | 2/2011 | Terry .......................... | 210/603 |

* cited by examiner

*Primary Examiner* — Christopher Upton
(74) *Attorney, Agent, or Firm* — John P. McGonagle

(57) ABSTRACT

In a wastewater treatment plant using methane gas, a byproduct of anaerobic sludge digestion, to generate energy in a combustor to run the plant, a system for collecting the gas stream from the plant biological process and feeding the gas stream, containing nitrous oxide emissions, into the combustor. The nitrous oxide is thermally reduced down to nitrogen ($N_2$) and oxygen ($O_2$).

4 Claims, 2 Drawing Sheets

NITROUS OXIDE REDUCTION FROM BIOLOGICAL WASTEWATER TREATMENT PROCESSES

CROSS-REFERENCE TO RELATED APPLICATIONS

Applicant claims the priority benefits of U.S. Provisional Patent Application No. 61/205,427, filed Jan. 16, 2009.

BACKGROUND OF THE INVENTION

This invention relates to biological water and wastewater treatment systems, and in particular, to a method for reducing the amount of nitrous oxide released to the atmosphere by such systems.

Nitrogen compounds promote unwanted growth of algae and other aquatic plants in lakes, rivers and other water resources. Consequently biological nitrogen removal (BNR) processes have become more prevalent in the treatment of wastewater. Nitrogen is removed biologically by nitrification and denitrification. Nitrification is an autotrophic aerobic process to convert ammonium into nitrate, through two successive reactions: $NH_4^+ \rightarrow NO_2^- \rightarrow NO_3^-$. Denitrification is a heterotrophic anoxic process whereby nitrate ($NO_3^-$) is converted into gaseous nitrogen ($N_2$). In both processes nitrous oxide ($N_2O$) is an intermediate that is released into the atmosphere.

Nitrous oxide is a gas which is very harmful to the environment because of its warming effect on the Earth's atmosphere. Currently there is a concern for chemical compounds in the Earth's atmosphere that act as "greenhouse gases." These gases allow sunlight to enter the atmosphere. However, when the sunlight is radiated back towards space as infrared radiation, the gases absorb the energy, thereby trapping heat within the Earth's atmosphere. According to the United States Energy Information Administration, nitrous oxide accounts for approximately 5% of total emissions, but is approximately 300 times more potent than carbon dioxide ($CO_2$) is as a greenhouse gas.

Nitrous oxide emissions occur from wastewater treatment plants in both the nitrification and denitrification processes, especially high nitrogen strength waste streams, such as recycle streams. Research has shown operational adjustments such as allowing complete nitrification and complete denitrification, or preventing the inhibition of the enzyme nitrous oxide reductase will minimize the formation of nitrous oxide. However, complete removal of nitrous oxide emissions has not been demonstrated.

Given that biological nitrogen removal is becoming more prevalent and has been shown to be the most viable way to reduce nitrogen discharges into water bodies, a method is required to reduce or remove completely the emission of nitrous oxide into the atmosphere.

SUMMARY OF THE INVENTION

Since the 1970's high performance racing automobiles have used nitrous oxide to increase performance. It is known that one may increase the power delivered by an internal combustion engine by increasing the amount of oxygen entering the combustion chamber. During normal operation, an internal combustion engine burns an air/fuel mixture consisting of vaporized fuel. There is approximately 3.75 parts of nitrogen to one part of oxygen in air. In nitrous oxide there is one part of nitrogen to one part of oxygen. Therefore, the introduction of nitrous oxide into the combustion chamber increases the amount of oxygen for the same flow rate. One such widely practiced method for increasing the concentration of oxygen supplied to the engine is to deliver oxygen via disassociated nitrous oxide to the air intake manifold of the engine. This is brought about by the fact that nitrous oxide breaks down to nitrogen ($N_2$) and oxygen ($O_2$) at a temperature of approximately 570 F. The benefits of nitrous oxide are twofold. First, additional oxygen is introduced into the combustion chamber allowing for additional fuel to be introduced thus increasing performance. Secondly, the nitrogen gas acts as a thermal sink and, therefore, tends to reduce the flame temperatures which reduces the amount of thermal nitrogen oxides or thermal NOx that is produced by combustion.

The present invention takes the nitrous oxide technology developed for racing cars and applies the principles to wastewater treatment plants. In addition to the cooling effect of nitrogen gas, the carbon dioxide ($CO_2$), which is also an off gas of the biological process, will also tend to reduce the thermal NOx production.

Today many large municipal wastewater treatment plants harness methane gas, a by-product of anaerobic sludge digestion, to generate energy to run the plant. The methane combustion process can be improved by collecting nitrous oxide emissions from the biological process and feeding the nitrous oxide into the combustion chamber.

The invention process offers several advantages: (a) nitrous oxide emissions to the atmosphere from the biological process are eliminated; (b) output from the combustion process is increased due to increased oxygen; and (c) nitrogen oxide emissions from the combustion gas stream are reduced.

These together with other objects of the invention, along with various features of novelty, which characterize the invention, are pointed out with particularity in this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF INVENTION

Figure 1:
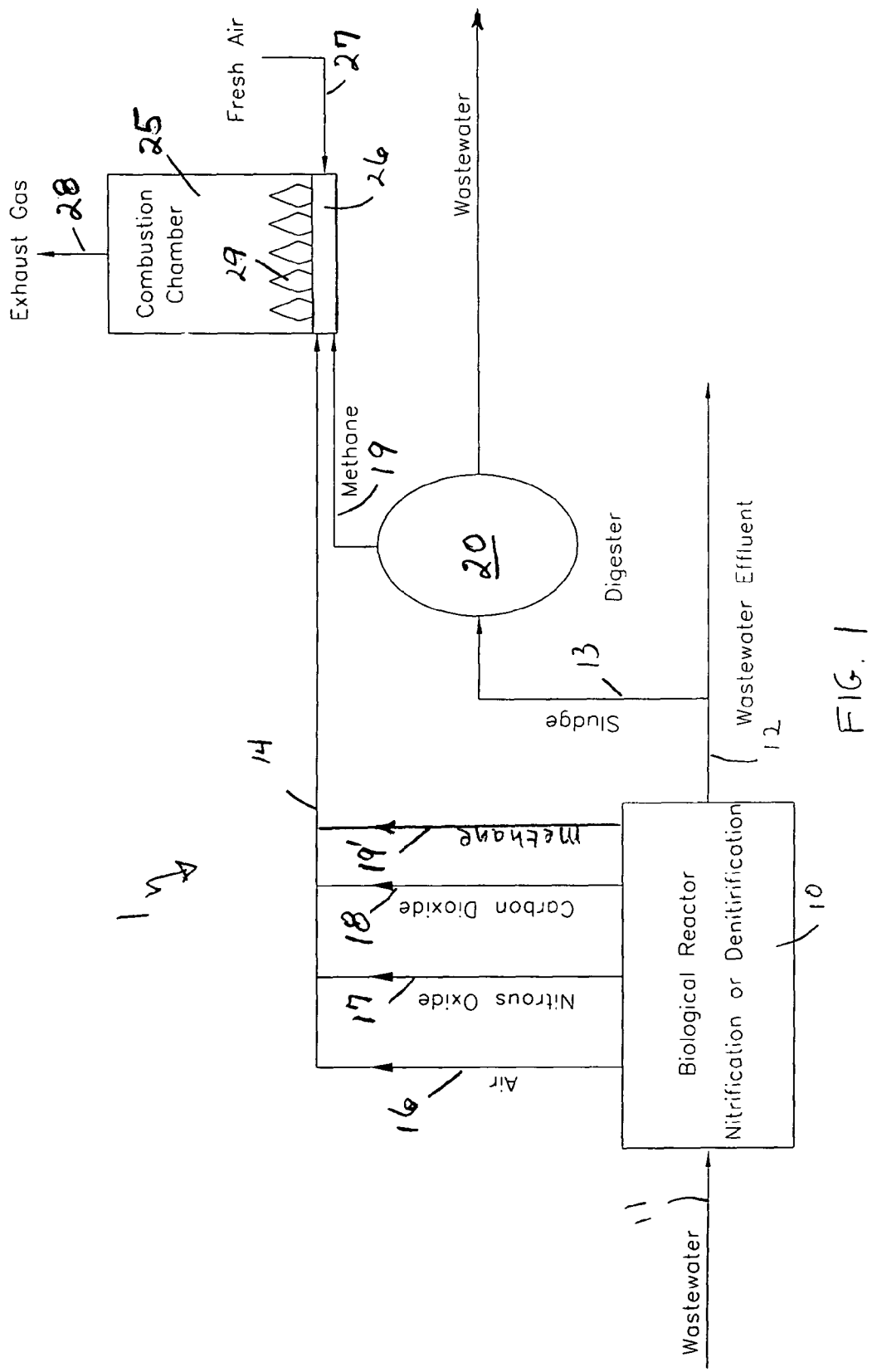
FIG. 1 is a functional block diagram of the process flow of a typical wastewater treatment plant modified according to the present invention.

Referring to the drawings in detail wherein like elements are indicated by like numerals, there are shown two diagrams of a waste stream gas contaminant removal system 1 constructed according to the principles of the present invention. The system 1 has a biological reactor 10 providing biological nitrogen removal to reduce nitrogen discharges into water bodies. A normal by-product of biological removal is the emission of nitrous oxide into the atmosphere. The present invention traps the biological reactor emission gas and redirects the gas stream, thereby preventing emission of nitrous oxide into the atmosphere.

The present invention system 1 has a biological reactor 10 for nitrification and denitrification of an incoming wastewater stream 11. Typically, air from an external source is fed into a main air supply line 32 and, by means of a blower 33, passed to an air diffuser 34 within the biological reactor 10. There are several by-product outputs from the biological reactor, i.e., wastewater effluent 12, a wastewater effluent sludge component 13, and a gas stream 14 channeled into a biological reactor gas output pipe 15. The effluent sludge 13 is passed into a digester 20 for processing. One of the by-products of the anaerobic sludge digestion is also a methane gas 19. The digester methane 19 is brought into a combustion chamber 25 through a mixing chamber 26 to provide fuel for the combustion chamber 25. The digester methane 19 is usually supplemented by other fuel sources 5.

The biological reactor gas stream 14 includes the following components, namely air 16, nitrous oxide 17, carbon dioxide 18 and methane 19. The biological reactor gas output pipe 15 is connected to the mixing chamber 26 wherein the gas stream methane 19' also supplements the digester methane fuel source 19 for the combustion chamber. The biological reactor output pipe 15 may have a fan 36 internally mounted within the output pipe to force the non-recirculated gas stream to the combustion mixing chamber 26.

Other combustion operations may also be supported in addition to biogas recovery, namely incineration, gas turbines or oil burners at a main plant. Additional fresh air 6 may be supplied to the combustion mixing chamber 26 from an external source. The amount of fresh air input 6 is controlled by a valve 7 in a fresh air line.

As stated above, the biological reactor by-products, air 16, nitrous oxide 17, carbon dioxide 18 and methane 19', are piped into the mixing chamber 26 through the biological reactor gas output pipe 15. The methane 19' is burnt as a supplemental combustion chamber fuel source. The nitrous oxide 17 is thermally reduced down to nitrogen ($N_2$) and oxygen ($O_2$) at a temperature of approximately 570 F. The nitrogen and carbon dioxide gases cool the combustion chamber flame 29 increasing the density of the air 27 and consequently the oxygen content about the flame. The resultant exhaust gas 28 from the combustion chamber 25 has a very low nitrous oxide component.

Figure 2:
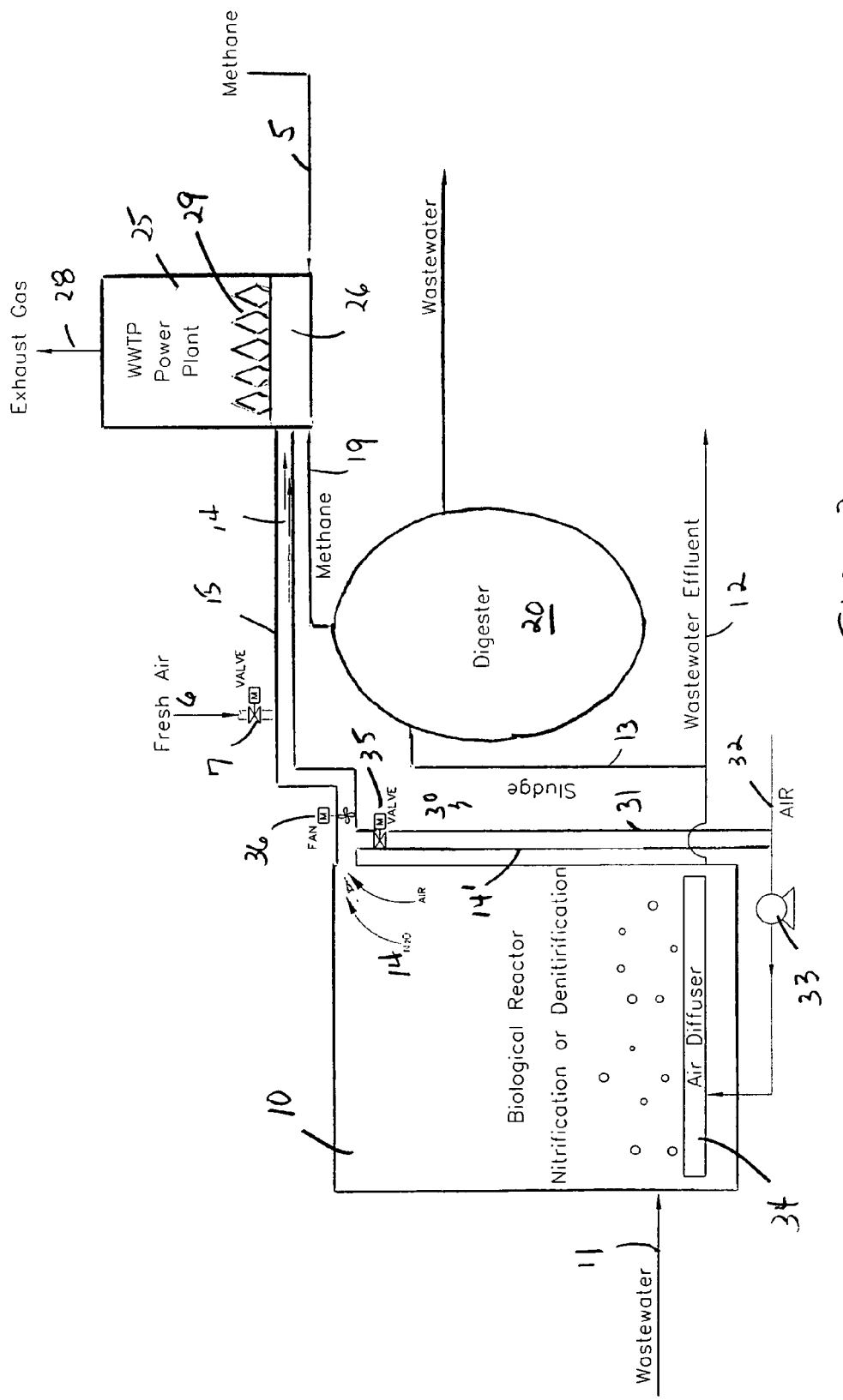
FIG. 2 is a schematic block diagram illustrating the invention process with gas recirculation.

To maintain combustion in the chamber 25, the air-fuel ratio cannot exceed 10:1. To control this ratio a gas recirculation process 30 is added to the system 1 shown in FIG. 1. The function of the recirculation process is to reduce the amount of air 16 in the biological reactor stream 14 from reaching the combustion mixing chamber. See FIG. 2. The recirculation process 30 is comprised of a recirculation pipe 31 interconnecting the biological reactor gas output pipe 15 with the main air supply line 32 feeding the biological reactor 10. A designated amount of the bioreactor gas 14' is passed through the recirculation pipe 31, the amount of which is controlled by a valve 35 in the recirculation pipe 31. This reduces the amount of air 16 in the original gas stream 14 reaching the combustion chamber 25. The recirculated bioreactor gas 14' is re-inserted into the biological reactor and is re-processed along with any necessary fresh air.

It is understood that the above-described embodiment is merely illustrative of the application. Other embodiments may be readily devised by those skilled in the art which will embody the principles of the invention and fall within the spirit and scope thereof.

I claim:

1. In a wastewater treatment plant, a waste stream contaminant removal system, comprising:
    a biological reactor for nitrification and denitrification of an incoming wastewater stream, said biological reactor outputting a wastewater effluent, a wastewater effluent sludge component, and a gas stream having air, nitrous oxide, carbon dioxide and methane;
    a biological reactor gas output pipe channeling said gas stream to a combustor;
    a digester receiving and processing said wastewater effluent sludge component by means of an anaerobic sludge digestion process generating a methane gas;
    said combustor having a combustion chamber supplied by a mixing chamber, said digester providing said digester methane gas to said mixing chamber wherein said methane gas is provided to the combustion chamber from said mixing chamber as a fuel source;
    wherein the biological reactor gas output pipe channels the gas stream to the mixing chamber wherein the gas stream is passed to the combustion chamber from said mixing chamber;
    wherein the gas stream methane is burnt as a supplemental combustion chamber fuel source;
    wherein the nitrous oxide is thermally reduced down to nitrogen ($N_2$) and oxygen ($O_2$) at a temperature in the range of 570 F.

2. The system as recited in claim 1, further comprising:
    an air diffuser within the biological reactor;
    a main air supply line connecting said air diffuser with an external air supply;
    a blower forcing air from said external air supply into said biological reactor;
    a recirculation pipe interconnecting the biological reactor gas output pipe with the main air supply line;
    a valve within said recirculation pipe, said valve adapted to pass a designated amount of the biological reactor gas stream through the recirculation pipe into said main air supply line into said biological reactor.

3. A system as recited in claim 2, further comprising:
    a fan internally mounted within the biological reactor gas output pipe to force the gas stream to the combustion mixing chamber.

4. A system as recited in claim 3, further comprising:
    a fresh air line connecting said mixing chamber with an external air supply.

* * * * *